United States Patent
Lawlor et al.

(10) Patent No.: US 10,885,066 B2
(45) Date of Patent: Jan. 5, 2021

(54) AREA MONITORING SYSTEM AND METHOD OF MERGING OCCURRENCE RECORDS

(71) Applicant: GENETEC INC., St-Laurent (CA)

(72) Inventors: Sean Lawlor, Dollard-des-Ormeaux (CA); Jean-David Trepanier, St-Hubert (CA)

(73) Assignee: GENETEC INC., St-Laurent (CA)

( * ) Notice: Subject to any disclaimer, the term of this patent is extended or adjusted under 35 U.S.C. 154(b) by 235 days.

(21) Appl. No.: 15/991,409

(22) Filed: May 29, 2018

(65) Prior Publication Data

US 2019/0347353 A1 Nov. 14, 2019

Related U.S. Application Data

(60) Provisional application No. 62/670,662, filed on May 11, 2018.

(51) Int. Cl.
| | |
|---|---|
| *G06F 16/28* | (2019.01) |
| *G06F 17/15* | (2006.01) |
| *G06F 11/30* | (2006.01) |
| *G06F 16/29* | (2019.01) |
| *G06F 16/907* | (2019.01) |
| *G06F 16/909* | (2019.01) |

(52) U.S. Cl.
CPC ........ *G06F 16/285* (2019.01); *G06F 11/3072* (2013.01); *G06F 16/29* (2019.01); *G06F 16/907* (2019.01); *G06F 16/909* (2019.01); *G06F 17/15* (2013.01); *G06F 2201/80* (2013.01)

(58) Field of Classification Search
CPC .... G06F 16/909; G06F 16/907; G06F 16/285; G06F 16/29; G06F 11/3072; G06F 17/15; G06F 2201/80; G06F 16/215; G06F 16/27
See application file for complete search history.

(56) References Cited

U.S. PATENT DOCUMENTS

| | | | | |
|---|---|---|---|---|
| 8,924,872 | B1 * | 12/2014 | Bogomolov | ............ H04W 4/90 715/764 |
| 9,715,668 | B1 * | 7/2017 | Brandt | ............... G06Q 10/0631 |
| 9,852,606 | B1 * | 12/2017 | Heier | ................... G06F 16/248 |
| 10,514,837 | B1 * | 12/2019 | Li | .......................... G06F 3/0481 |
| 2004/0034666 | A1 * | 2/2004 | Chen | ....................... G06F 16/29 |
| 2017/0131115 | A1 * | 5/2017 | Park | .................. G01C 21/3694 |

(Continued)

OTHER PUBLICATIONS

El-Aziz, Eman Mohamed Abd, Saleh Mesbah, and Khaled Mahar. "GIS-based decision support system for criminal tracking." In 2012 22nd International Conference on Computer Theory and Applications (ICCTA), pp. 30-34. IEEE, 2012. (Year: 2012).*

*Primary Examiner* — Jesse P Frumkin

(74) *Attorney, Agent, or Firm* — Anglehart et al.

(57) ABSTRACT

An area monitoring system and a method of merging occurrence records in an area monitoring system whereby occurrences are monitored or recorded in external databases. The method includes receiving a first occurrence record, indicative of an event; on the basis of the applicable correlation rule, identifying a set of databases to be queried; generating a query for data according to a respective protocol; generating a correlated dataset of occurrence records from at least a subset of the set of occurrence records and the first occurrence record; and displaying to a user a visual representation of the correlated dataset of occurrence records.

20 Claims, 13 Drawing Sheets

(56) References Cited

U.S. PATENT DOCUMENTS

| | | | |
|---|---|---|---|
| 2018/0003513 A1* | 1/2018 | Guzik | H04N 21/4223 |
| 2018/0011670 A1* | 1/2018 | Oyenan | G01C 21/3676 |
| 2018/0082202 A1* | 3/2018 | Vepakomma | G06F 16/29 |
| 2018/0210892 A1* | 7/2018 | Stayner | G06F 16/9537 |
| 2018/0253617 A1* | 9/2018 | Tsai | G06K 9/00979 |
| 2019/0050473 A1* | 2/2019 | Bhattacharya | G06Q 50/26 |
| 2019/0164246 A1* | 5/2019 | Ferranti | G06Q 50/265 |

* cited by examiner

AREA MONITORING SYSTEM AND METHOD OF MERGING OCCURRENCE RECORDS

TECHNICAL FIELD

The present application relates to the field of monitoring and surveillance, and more particularly to monitoring and surveillance using a plurality of databases, where the content of the databases may be used to report correlated datasets corresponding to events of interest.

BACKGROUND

In order to improve the safety within a city, the city gathers and stores information regarding events that can be tied to criminal activity. For instance, the city may provide security cameras to record license plate readings tied to traffic violations or have a database management by a computer-aided dispatch system to record different 911 calls that have taken place a given period within the city. Other information may include the location and identity of known criminals, such as sex offenders. The city may also have microphones to record sounds that could be correlated to a gunshot.

The gathered data may be harnessed to predict future events of interest, or to capture perpetrators. Law enforcement agencies may utilize the system to rapidly solve a crime or assist a person in distress.

However, this information is often not gathered by a single entity. As a result, this data may be stored in a plurality of different databases, these databases having its own properties and managed by different entities. Therefore, the data may not be stored in a centralized database. Moreover, it may not be optimal to retrieve and store the information in a single database due to the quantity and size of the data retrieved. Moreover, keeping the information in its source database prevents replication of data and ensures the validity of the data (e.g. that the data has not been tampered).

Known monitoring system includes a solution which utilizes SHAREPOINT™ Indexing Service to search data on predefined rules. However, the system does not allow for searching/correlating data that the system does not itself house internally (i.e. no proxied data sources). The system does not support adjusting the correlation search parameters in real-time. The data sources that the system supports are of a predefined, limited set and not extendable.

Therefore, it would be advantageous to access the databases remotely while only retrieving the necessary information from these databases such that the information can be used to further improve the surveillance of the city.

SUMMARY

The present disclosure relates to an improved monitoring system, called an area monitoring system.

The system is for retrieving, from a plurality of databases, occurrence records stored in the databases that correspond to an event. The user sets up a correlation rule that is associated with a given event (a first occurrence record). The correlation rule consists of a set of conditions that are to be verified upon the occurrence of the event. The set of conditions can be verified by accessing occurrence records stored in databases that are connected to the system. A query is sent to databases that store occurrence record types corresponding to those that are relevant to the correlation rule. Upon receipt of the occurrence records from the databases, the conditions of the correlation rule are verified based on the received occurrence records. If the conditions of the correlation rule are met, the relevant occurrence records are reported to the user. The user may receive an alert that a positive match corresponding to a correlation rule has occurred.

The system can also integrate new databases with new types of occurrence record types. As such, the occurrence record types that the system supports are extendable.

A broad aspect is a method of merging occurrence records in an area monitoring system whereby occurrences are monitored or recorded in external databases. The method includes receiving a first occurrence record, indicative of an event, including a geographical parameter, a chronological parameter and an occurrence record type, and identifying an applicable correlation rule in a correlation rule database based at least in part on the occurrence record type. The method includes, on the basis of the applicable correlation rule, identifying a set of databases to be queried from a plurality of databases, each database of the plurality of databases comprising a plurality of occurrence records, each occurrence record of the set of databases being associated with a respective occurrence record type. The method includes, for each database in the set of databases, generating a query for data according to a respective protocol, the query comprising at least a geographic constraint or chronological constraint based on, respectively, the geographical parameter or the chronological parameter of the first occurrence record. The method includes receiving in response to the query a set of occurrence records, each occurrence record of the set of occurrence records originating from one of the databases in the set of databases, and having at least a geographical parameter or chronological parameter respecting the geographic constraint or chronological constraint, respectively, set forth in the query to its originating database. The method includes generating a correlated dataset of occurrence records from at least a subset of the set of occurrence records and the first occurrence record. The method includes displaying to a user a visual representation of said correlated dataset of occurrence records.

In some embodiments, the method may include defining and storing an interrelationship between the occurrence records of the subset of occurrence records and the first occurrence record, the interrelationship comprising a common event to which each of the interrelated occurrence records are related. The method may include displaying to a user a visual representation of the interrelationship between the occurrence records of the correlated dataset.

In some embodiments, the visual representation of the interrelationship between the occurrence records of the correlated dataset may be displayed on a map on a display, and at least a portion of the occurrence records of the correlated dataset may appear as pins on the map.

In some embodiments, the first occurrence record may correspond to a one of a received 911 call, a license plate read event, a license plate hit event, camera bookmark event and an access control event.

In some embodiments, the correlation rule may include a set of conditions, and the method may include, prior to the generating a correlated dataset of occurrence records, verifying that the conditions of the correlation rule are met.

In some embodiments, the correlation rule may be associated with at least one occurrence record type, and wherein each identified database to be queried stores occurrence records corresponding to at least one of the at least one occurrence record type.

In some embodiments, the identifying an applicable correlation rule in a correlation rule database may be further based on at least one initial trigger event condition of a correlation rule.

In some embodiments, the identifying of the databases to be queried may include retrieving the coordinates of the databases to be queried from a database attribute database.

In some embodiments, the at least one additional parameters of the first occurrence record may include the occurrence record type.

In some embodiments, the method may include generating an alert when a correlated dataset has been generated.

In some embodiments, the respective protocol of the query may be a remote protocol.

Another broad aspect is an area monitoring system comprising correlation engine for communicating with a set of databases and a store of correlation rules to provide a report output when occurrence records of said set of databases satisfy at least one of said correlation rules. The correlation engine includes a processor and a processor-readable memory storing instructions to cause said processor to perform: receiving a first occurrence record, indicative of an event, including a geographical parameter, a chronological parameter and an occurrence record type, and identifying an applicable correlation rule in a correlation rule database based at least in part on the occurrence record type. The correlation engine includes a processor and a processor-readable memory storing instructions to cause said processor to perform, on the basis of the applicable correlation rule, identifying a set of databases to be queried from a plurality of databases, each database of the plurality of databases comprising a plurality of occurrence records, each occurrence record of the set of databases being associated with a respective occurrence record type. The correlation engine includes a processor and a processor-readable memory storing instructions to cause said processor to perform, for each database in the set of databases, generating a query for data according to a respective protocol, the query comprising at least a geographic constraint or chronological constraint based on, respectively, the geographical parameter or the chronological parameter of the first occurrence record. The correlation engine includes a processor and a processor-readable memory storing instructions to cause said processor to perform receiving in response to the query a set of occurrence records, each occurrence record of the set of occurrence records originating from one of the databases in the set of databases, and having at least a geographical parameter or chronological parameter respecting the geographic constraint or chronological constraint, respectively, set forth in the query to its originating database. The correlation engine includes a processor and a processor-readable memory storing instructions to cause said processor to perform providing a report output comprising a correlated dataset of occurrence records from at least a subset of the set of occurrence records and the first occurrence record.

In some embodiments, the instructions may cause the processor to perform defining and storing an interrelationship between the occurrence records of the subset of occurrence records and the first occurrence record, the interrelationship may include a common event to which each of the interrelated occurrence records are related. In some embodiments, the instructions may cause the processor to perform displaying to a user a visual representation of the interrelationship between the occurrence records of the correlated dataset.

In some embodiments, the instructions may cause the processor to perform generating the visual representation of the interrelationship between the occurrence records of the correlated dataset on a map appearing on a display, and at least a portion of the occurrence records of the correlated dataset may appear as pins on the map.

In some embodiments, the instructions may cause the processor to perform generating an alert when a correlated dataset has been generated.

In some embodiments, the first occurrence record may correspond to one of a received 911 call, a license plate read event, a license plate hit event, camera bookmark event and an access control event.

In some embodiments, the correlation rule may include a set of conditions. The instructions may cause the processor to perform prior to the generating a correlated dataset of occurrence records, verifying that the conditions of the correlation rule are met.

In some embodiments, the correlation rule may be associated with at least one occurrence record type, and wherein each database of the identified databases to be queried may store occurrence records corresponding to at least one of the at least one occurrence record type.

In some embodiments, the identifying of the databases to be queried may include retrieving the coordinates of the databases to be queried from a database attribute database.

In some embodiments, the identifying an applicable correlation rule in a correlation rule database may be further based on at least one initial trigger event condition of a correlation rule.

In some embodiments, the at least one additional parameters of the first occurrence record may include the occurrence record type.

In some embodiments, the respective protocol of the query may be a remote protocol.

Another broad aspect is a system for merging occurrence records in an area monitoring system whereby occurrences are monitored or recorded in external databases. The system includes a store of event correlation rules defining a logical expression having parameters related to occurrence records from a set of databases. The system includes a correlation module connected to at least one of the set of external databases and the store of event correlation rules and configured to signal when a given event record corresponds to an event correlation rule; identify ones of the set of databases having occurrence records whose parameters are found in the event correlation rule corresponding to the given event record; send a query to the ones of the set of databases to retrieve a set of occurrence records; apply the logical expression of the event correlation rule to which the given event record corresponds to determine if the event correlation rule is satisfied based on values of the parameters of the set of occurrence records; and when the event correlation rule is satisfied, provide reporting data based on the set of occurrence records and the given event record.

BRIEF DESCRIPTION OF THE DRAWINGS

The invention will be better understood by way of the following detailed description of embodiments of the invention with reference to the appended drawings, in which.

DETAILED DESCRIPTION

Figure 1A:
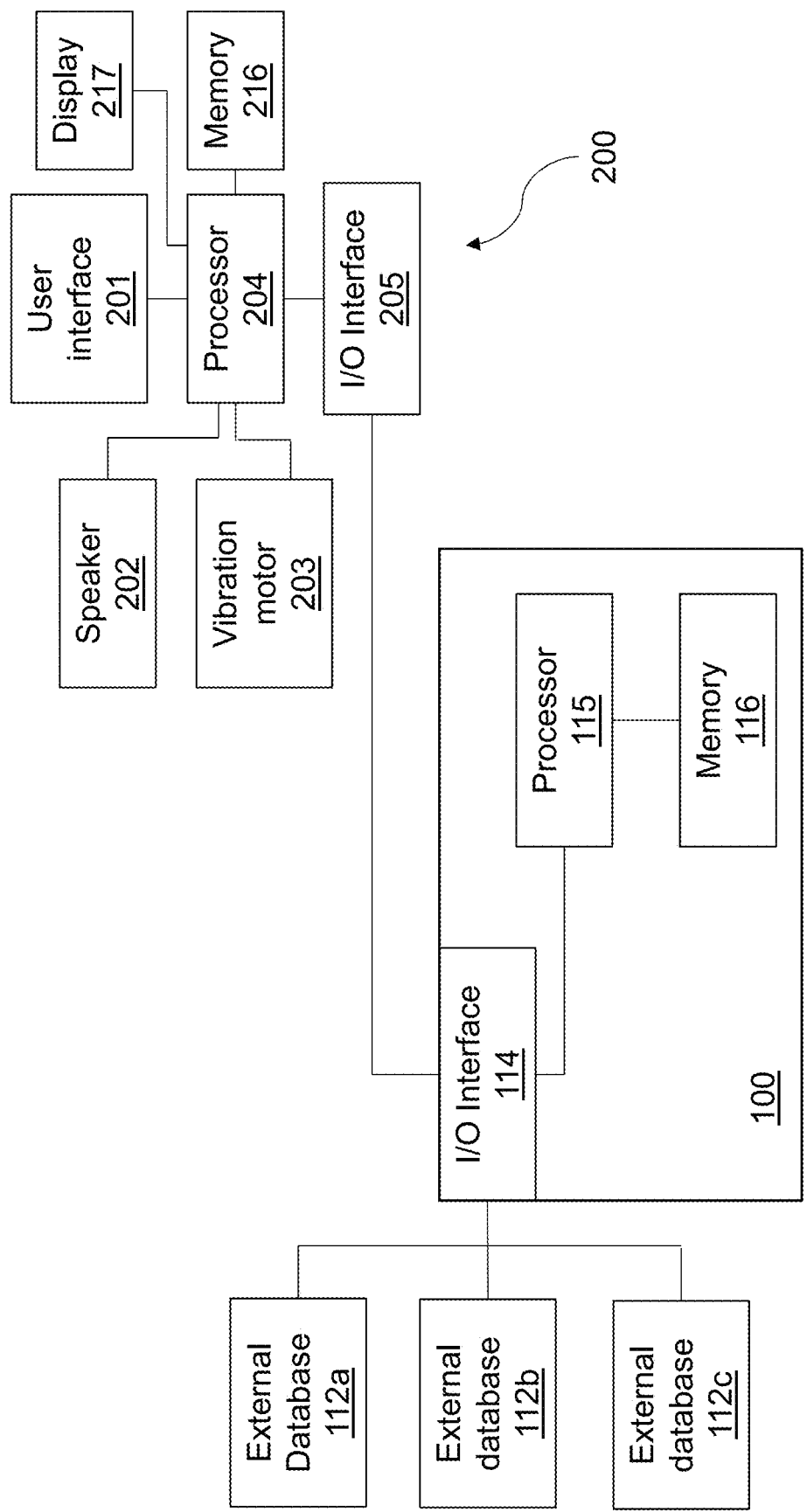
FIG. 1A is a block diagram of an exemplary area monitoring system architecture connected to a computing device and to external databases.

The present disclosure relates to an area monitoring system for merging occurrence records. The system is connected or connectable to a plurality of external datasources that are registered with the system. The system may access the external databases to retrieve certain information of interest. The system permits the rapid retrieval of information to report and/or alert the user of the occurrence of a relevant event in real-time. The relevancy of the event is determined as a function of a correlation rule established by a user as explained herein.

For purposes of illustration, reference is made in the present application to an area monitoring system used for security purposes, such as the identification of a crime associated with a known felon, the identification of a stolen vehicle, etc. However, it will be understood that the present system may be used for other purposes, such as for assisting tourists with the identification of events of interests occurring around the city, or for monitoring public transport or traffic, etc.

Definitions

By "occurrence record", it is meant information stored in a database, either an external database or internal database. The occurrence record has an occurrence record type, and may have a time parameter and a geographical parameter. The occurrence record may have other metadata and data associated with additional parameters. The data structure of the occurrence record may depend upon the configuration of the database in which the occurrence record is stored. Examples of occurrence records are license plate reads associated with a time and geographical parameter, the identity of a registered criminal with a location of the criminal, 911 call events with a time parameter, geographical parameter and a priority value; a gunshot event associated with the picking up of a sound that is identified to be a gunshot having a time parameter, a geographical parameter and perhaps the identification of the firearm, the positioning of a bus at a given time, an identified construction site blocking street access with a time parameter and a geographical parameter, a traffic accident event with a time parameter and a location parameter, etc.

By "correlation rule", it is meant a rule that is triggered upon the system receiving an initial occurrence record that is associated with an event. In some examples, the correlation rule may further have at least one initial trigger event condition associated with the occurrence record type that needs to be met in order for correlation rule to be triggered. The initial trigger event condition may be to verify that the initial occurrence record has certain parameters (e.g. for instance, if the initial occurrence record is a 911 call, the initial trigger event condition may be that the 911 call has a priority less or equal to "2"). The rule of the correlation rule has at least one condition that is verified after an occurrence record has been received by the system (e.g. the occurrence of an event). The condition(s) may be the verification of a value associated with a given occurrence record type. If the correlation rule is determined to be true, a report and/or alert is generated. If the correlation rule is false, no report and/or alert may be produced. The correlation rule may be set by a user using a user interface.

By "time parameter", it is meant a timestamp or time interval (a period) associated with an occurrence record.

By "geographical parameter", it is meant a location, such as the GPS coordinates, associated with an occurrence record. The geographical parameter may also be a location range or an area defined by a set of coordinates.

By "occurrence record type", it is meant the nature or type of the occurrence record. For example, the occurrence record type may a 911 call, the identity of a known criminal, a gunshot event, a license plate read event, etc. Databases storing occurrence records (i.e. information) may be associated with an occurrence record type.

By "query" it is meant a request for information from a database. The query may include an occurrence record type, a time parameter and a geographical parameter. The query may specify additional parameters as a function of the occurrence record type. For instance, when the occurrence record type is a database of convicts, the additional parameters may be convicts that have been charged with third degree murder, or convicted with third degree murder, or that are under the age of 25, that have blond hair, blue eyes, etc. The time parameter may be a defined time, or time range (e.g. in the two years preceding the date of the query). The geographical parameter may be a specific location (e.g. a set of coordinates), or an area (e.g. defines by a plurality of sets of coordinates).

By "set of occurrence records" it is meant at least one occurrence record that is retrieved from a database following a query generated and transmitted by the area monitoring system. The set of occurrence records is a data structure with occurrence records specific to the query. For example, if the query is for the identity and number of bakeries in a 10-mile radius from a given set of coordinates, each occurrence record retrieved from a database of properties as a result of the query may correspond to the details on a given bakery meeting the requirements of the query. The set of occurrence records then corresponds to the each of the details of the relevant bakeries. In some examples, when the database server has the necessary functionality, the set of occurrence records may include the value associated to the number of bakeries in the area, per the query. In other examples, the value may be determined by the report module as explained herein. In some examples, each of the occurrence records of the set of occurrence records may include a time parameter and a geographical parameter corresponding to the time parameter and the location of the query.

Figure 1B:
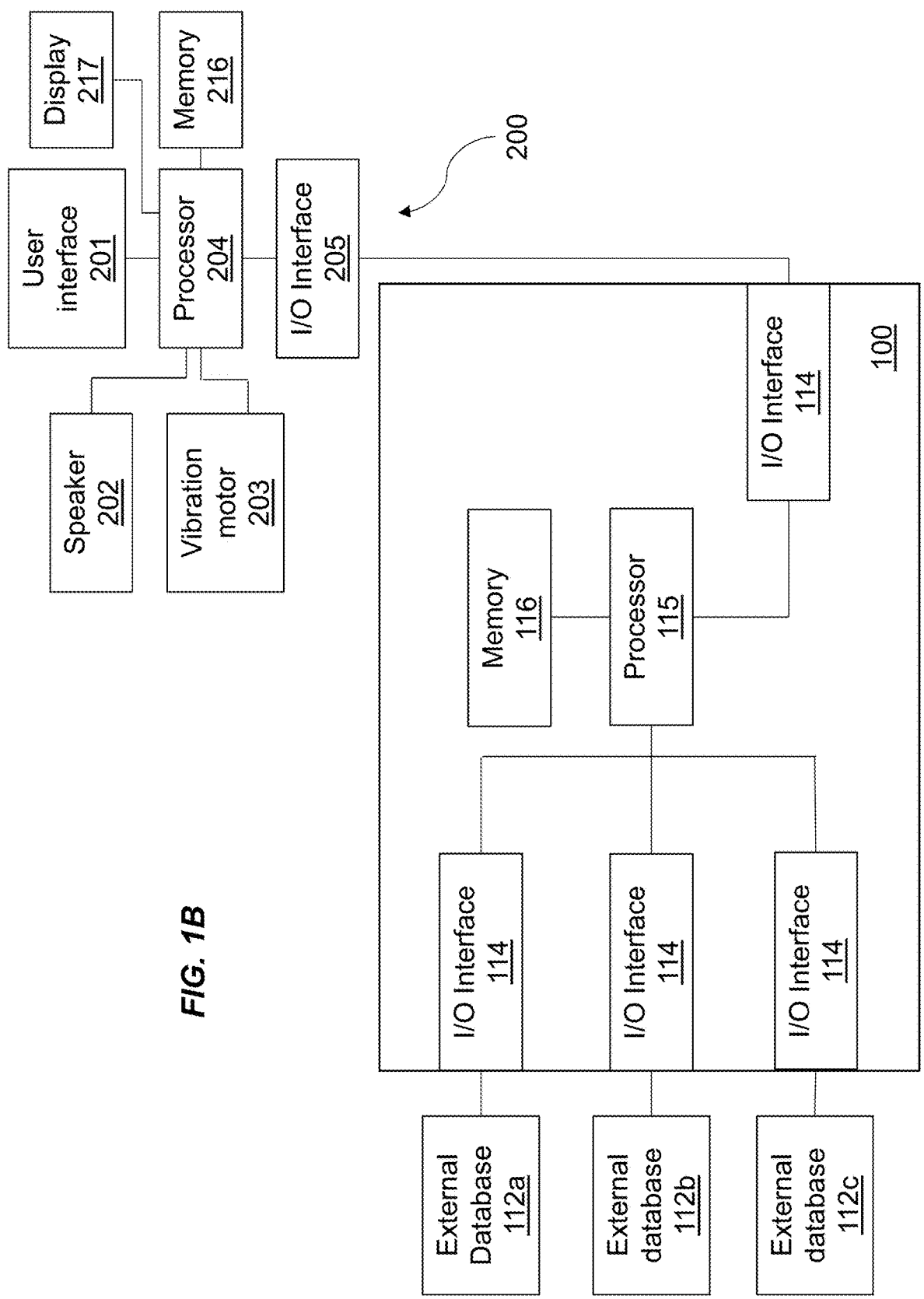
FIG. 1B is a block diagram of another exemplary area monitoring system architecture connected to a computing device and to external databases.

The Area Monitoring System:

Reference is now made to FIGS. 1A and 1B, illustrating an exemplary area monitoring system 100 architecture, connected to a plurality of exemplary external databases 112 and at least one client computing device 200.

The system 100 may be in communication with one or multiple client devices 200. The system 100 sends a report to the client device 200 when a correlation rule set by the user of the client device 200 is verified as being true, triggered by the receipt of an occurrence record.

The system 100 has a processor 115, memory 116 and at least one input/output interface 114 for communication with one or more external databases (the external database(s) is/are referred herein generally as database(s) 112, or specifically as databases 112a, 112b, 112c, etc.), and/or the input/output interface 205 of the client device 200.

As shown in FIG. 1B, the system 100 may have an interface 114 for each of the databases 112. A separate I/O interface 114 may also be provided in system 100 for communicating with the I/O interface 205 of the client device 200.

The processor 115 may be a general-purpose programmable processor. In this example, the processor 115 is shown as being unitary, but the processor may also be multicore, or distributed (e.g. a multi-processor).

The computer readable memory 116 stores program instructions and data used by the processor 115. The computer readable memory 116 may also store locally occurrence records, acting as a local database. The memory 116 also stores correlation rule data structures corresponding to the active correlation rules of the system 100. The memory 116 also stores information regarding the databases 112 that are accessible by the system 100, such as the identity of the database, the configuration type of the database, the occurrence record type of the database, etc. (i.e. the database attribute data structures). The computer readable memory 170, though shown as unitary for simplicity in the present example, may comprise multiple memory modules and/or cashing. In particular, it may comprise several layers of memory such as a hard drive, external drive (e.g. SD card storage) or the like and a faster and smaller RAM module. The RAM module may store data and/or program code currently being, recently being or soon to be processed by the processor 115 as well as cache data and/or program code from a hard drive. A hard drive may store program code and be accessed to retrieve such code for execution by the processor 115 and may be accessed by the processor 115 to store, correlation rule data structures, data attribute data structures, etc. as explained herein. The memory 116 may have a recycling architecture for storing, for instance, occurrence records, correlation rules, database coordinates, where older data files are deleted when the memory 116 is full or near being full, or after the older data files have been stored in memory 116 for a certain time.

The I/O interface 114 is in communication with the processor 115. The I/O interface 114 is a network interface and may be a wireless interface for establishing a remote connection with, for example, a remote server, an external database 114, the client device 200, etc. For instance, the I/O interface 114 may be an Ethernet port, a WAN port, a TCP port, etc.

The processor 115, the memory 116 and the I/O interfaces 114 may be linked via BUS connections.

The databases 112 are hosted on remote servers. A database 112 may contain occurrence records, information, corresponding to at least one occurrence record type.

In some examples, the system 100 may have a local database stored, e.g., in memory 116, that contains occurrence records of at least one occurrence record type.

The computing device 200 may be a remote computing device (i.e. client). The computing device 200 is in communication with the I/O interface 114 of the system 100. The computing device 200 has a processor 204, a memory 216, an I/O interface 205 that may be linked via BUS connections. The computing device 200 may have a speaker 202, a vibrator motor 203 for causing the computing device 200 to vibrate, etc. The computing device 200 may be a desktop computer, a laptop, a smartphone, a tablet, etc. The computing device 200 has a display 217 (e.g. a screen, a tactile display, etc.)

A client application program may be stored in memory of the computing device 200 that is associated with the system 100, the client application program providing the user with an interface to interact with the system 100. In other examples, the user may access a website that allows the user to communicate with the system 100, such as set an interface to set a new correlation rule and manage active correlation rules (e.g. FIG. 11). The website may provide the user with a user interface that can be accessed by the user. The user may also receive the reports and/or alerts appearing on the client application program and/or the website of the system 100 running on or accessible by the computing device 200. For instance, the client application program may cause the vibration motor 203 of the computing device 200 to vibrate or produce an auditive response upon the receipt of a report produced by the system 100.

The system 100 may be in communication with multiple computing devices 200 (not shown) (e.g. multiple clients).

In some examples, the system 100 may include at least one computing device 200, where, for instance, the connection between the system 100 and the computing device 200 may be a wired connection.

Figure 2:
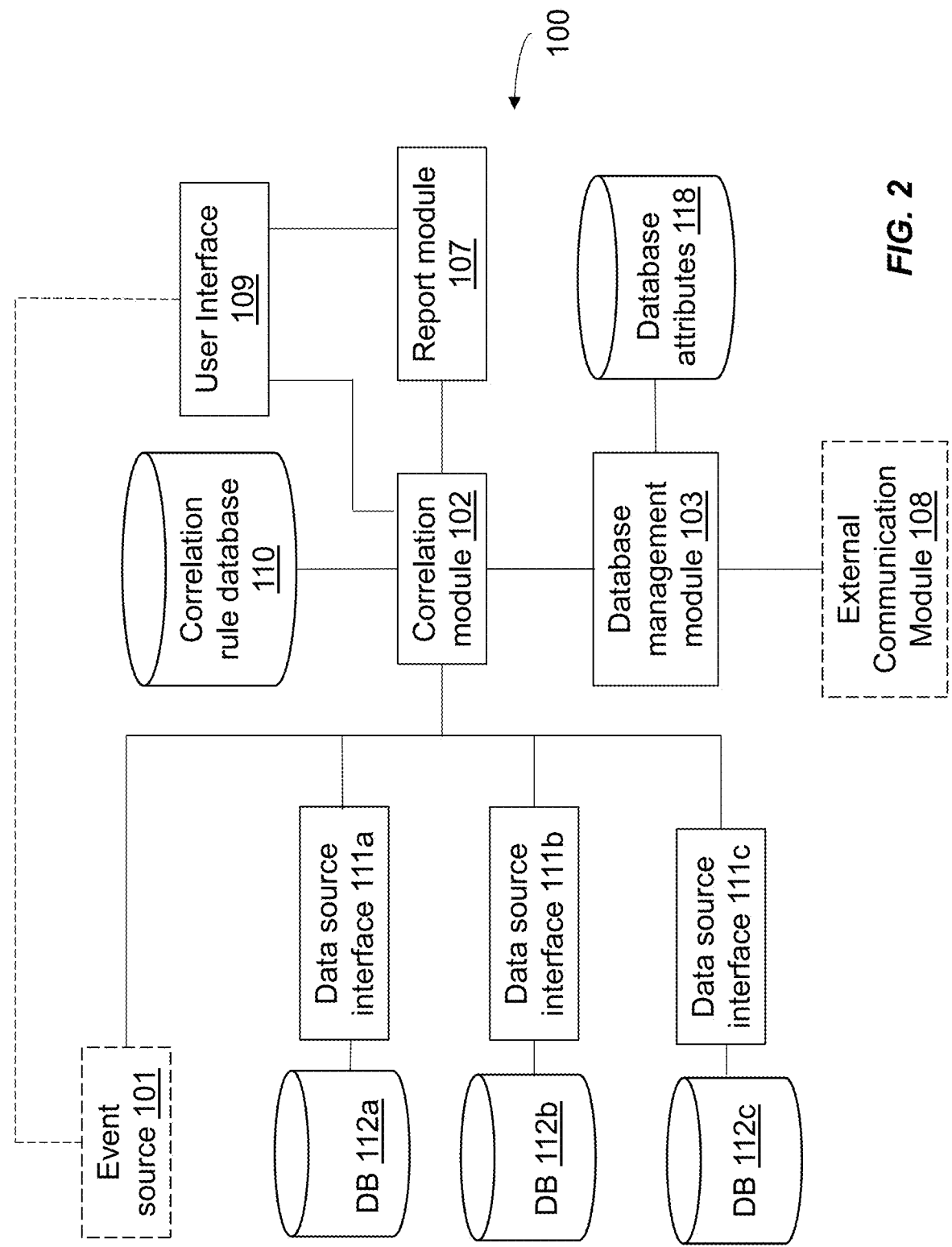
FIG. 2 is a block diagram of an exemplary area monitoring system software architecture connected to external databases.

Reference is now made to FIG. 2, illustrating the architecture of an exemplary area monitoring system 100.

The system 100 has an exemplary program code, stored in memory 116, that includes a correlation module 102, a database management module 103 and a report module 107.

The system 100 has stored in memory 116 a database attributes database 110 and a correlation rule database 110.

The system 100 may also have at least one data source interface 111 (referred to herein as data source interface 111a for database 112a, as data source interface 111b for database 112b, as data source interface 111c for database 112c, etc.).

The data source interface 111 receives a query in a native format of the system 100, adapts the format of data or queries transmitted to a database 112 to the format and/or configuration of the specific database. The data source interface 111 may also adapt the format and/or properties of the occurrence records transmitted from the database 112 such that they may be received and analyzed by the correlation module 102. In some examples, the data source interface 111 may be an application programming interface (API).

The user interface 109 receives user input, such as the specifications of a new correlation rule. The user interface 109 may be a display, e.g. display 217, that receives user input directly from the user. The user input may be transmitted to the correlation module 102.

In some examples, the user input may trigger an event that causes the system 100 to generate a query for occurrence records in the different databases 112. For instance, the user may prompt the system 100 to generate a query to verify certain conditions specified by the user, the user setting the conditions, the conditions associated with the occurrence record types to be queried.

Correlation Rule Data Structure:

The correlation rule database 110 stores all of the correlation rules generated by the users (clients) of the system 100. Each correlation rule may be represented as a correlation rule data structure (e.g. a record) stored in the correlation rule database 110. The correlation rule data structure may contain information on the occurrence record type that triggers the system 100 to generate a query based on the correlation rule. The correlation rule data structure may also include at least one initial event trigger condition.

Figure 11:
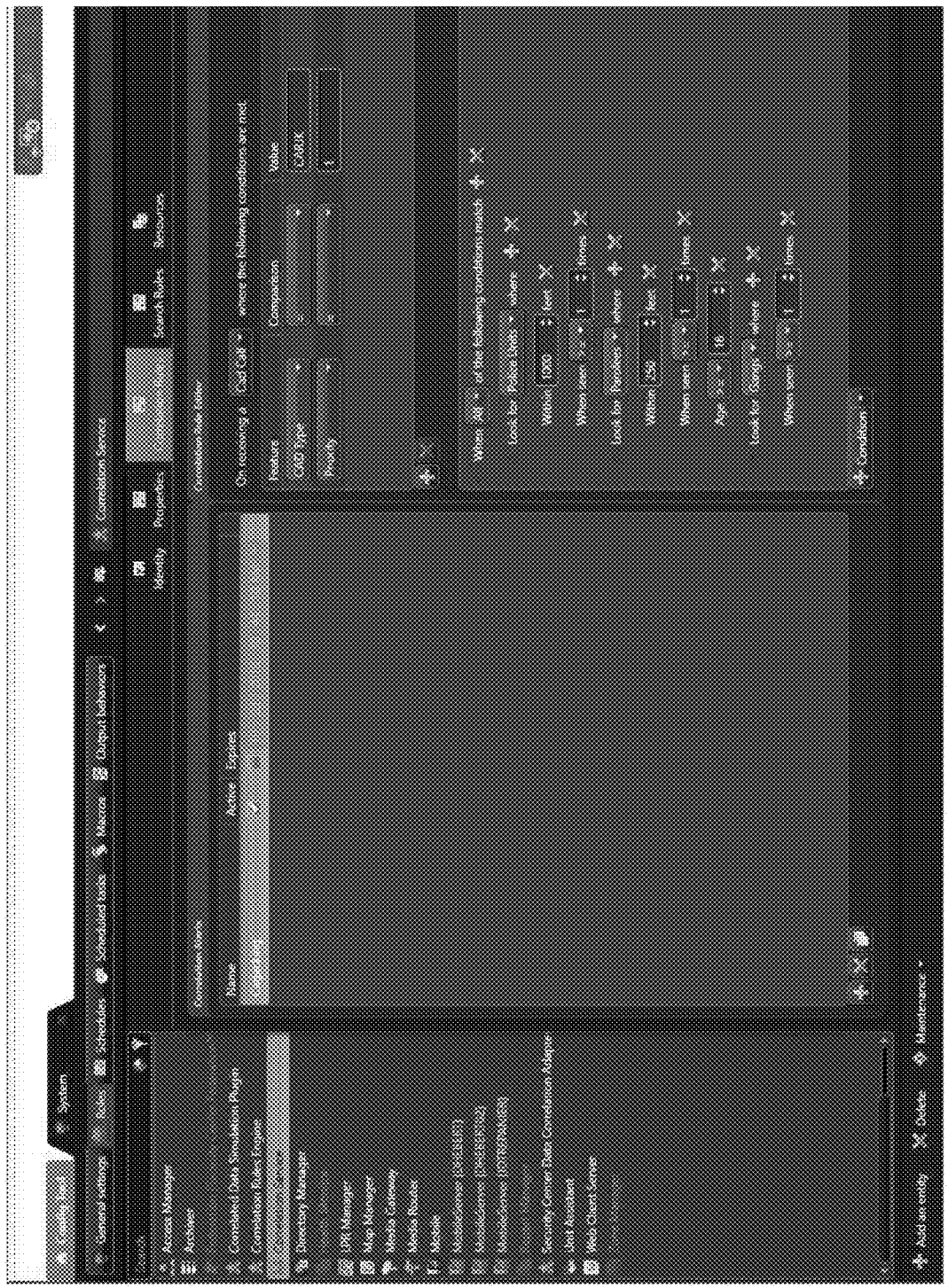
FIG. 11 is a depiction of a window for creating a correlation rule in an exemplary graphical user interface for an area monitoring system.

The correlation rule data structure may include the conditions of the correlation rule. Examples of conditions are, as shown in FIG. 11:
 look for police units within 1000 feet;
 look for parolees within 250 feet when seen more than 1 time, with an age over 16;
 there is at least one gang registered in a designated sector.

The correlation rule data structure may include metadata identifying the client that has created the correlation rule (e.g. the client number; the IP address, etc.). The correlation rule data structure may include data on the time of creation of the correlation rule. The correlation rule data structure may include data corresponding to an expiration time, the correlation rule data structure deleted from memory upon expiration. The correlation rule data structure may include an integer that is increased by one when the correlation rule is verified as being true, etc.

Database Attributes Data Structure:

The database attributes database 110 contains information on the different databases 112 that may be queried by the system 100. A database attribute data structure for each database queryable by the system 100 may be stored in the database attribute database 118. The database attribute data structure (e.g. a record) for each database 112, stored in the database attributes database 110 may contain, but is not limited to:
 the configuration of the database (the properties of the database);
 the occurrence record type stored in the database;
 a list of fields stored in an occurrence record stored (e.g. for a criminal database: a string for the eye colour, a string for the height, the hair colour, an age which is an integer; date of registration in the database which is a timestamp, etc.);
 a time value indicative of when the database was added to the database attribute database 118;
 the identity of the database in charge of the database (i.e. in the case of an external database, the database may be managed by an entity other than the one managing the system 100); and
 the coordinates of the database (e.g. a GUID that e.g., identifies the role of the database in the system 100).

The database attributes database 110 produces a mapping of the different databases 112, where the mapping can be accessed by the database management module 103 to determine identify the databases 112 to be queried as a function of a correlation rule.

Figure 3:
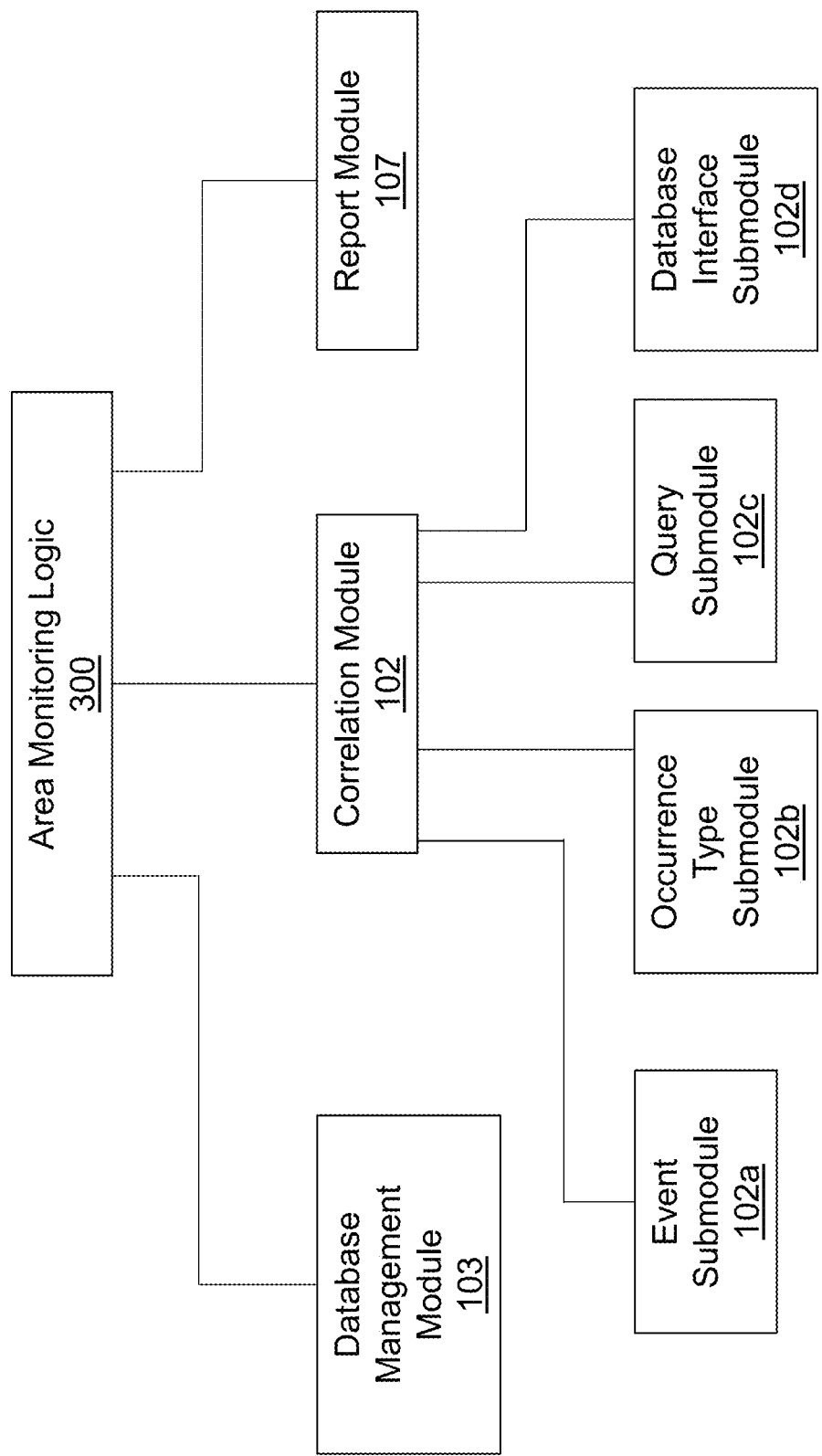
FIG. 3 is a block diagram of exemplary area monitoring logic that is stored in memory and implemented by a processor of an exemplary area monitoring system.

Area Monitoring Logic:

Reference is now made to FIG. 3, illustrating area monitoring logic 300, an exemplary program code stored in memory, such as memory 116, that can be called and executed by a processor (e.g. processor 115) to merge occurrence records and create a correlated dataset of occurrence records as explained herein.

The area monitoring logic 300 receives a specific occurrence record. The area monitoring logic 300 then retrieves one or more correlation rules corresponding to the specific occurrence record. The area monitoring logic 300 generates a query for occurrence records as a function of the correlation rule and the specific occurrence record. The area monitoring logic 300 then generates a correlated dataset of occurrence records as a function of the set of occurrence records received from the databases as a result of the query.

The area monitoring logic 300 includes a database management module 103, a correlation module 102 and a report module 107.

The database management module 103 comprises program code for managing the databases that are queryable by the system 100. The database management module 103 maps the different databases 112 and stores in the database attribute database 118 the database attribute data structure for each of the given databases 112. The database management module 103 may also retrieve from the database attribute database 118 the coordinates for databases to be queried (corresponding to the information required by the correlation rule) or the database attribute data structure for the databases that correspond to the correlation rule.

The correlation module 102 includes an event submodule 102a, an occurrence type submodule 102b and a query submodule 102c. The correlation module 102 may have a database interface submodule 102d.

The event submodule 102a includes program code for retrieving appropriate correlation rules as a function of a received occurrence record associated with an event. For instance, the event may be a 911 call, a camera bookmark event (a bookmark added to an image stream produced by a camera), a license plate read, a license plate hit, an access control event (e.g. a door was opened, a door was closed, a badge was read by a reader, an alarm was turned on, an alarm was turned off, etc.), etc. An occurrence record is created in a database 112, documenting and storing the event in the database 112.

In some examples, the event submodule 102a may also comprise program code for receiving an event from an event source 101 (e.g. a user creating an event from the user interface 109 to prompt a specific query). The event may be a request to issue a query based on a given correlation rule. In this example, the event submodule 102a may retrieve from the correlation rule database 110 the correlation rule corresponding to the event. In other examples, the event may include its own conditions, where the user may send as an event a request to generate a query to verify certain conditions and/or parameters specified in the request event. For instance, the user may make a request to search for any gang members that have been identified within a fifty-mile radius around a given geographical point, as well as gunshots recorded in the same location and in the hour preceding the request. In such an example, as the request contains the conditions and parameters for generating the query, the event submodule 102a does not have to retrieve corresponding correlation rules from the correlation rule database.

In other examples, the event submodule 102a may also include program code to receive a new correlation rule set by a user on a computing device 200. The event submodule 102a stores the correlation rule in memory as a correlation rule data structure.

The occurrence type submodule 102b includes program code directed to receive a correlation rule data structure corresponding to the occurrence record. The occurrence type submodule 102b may then identify occurrence record types as a function of the occurrence record types of the correlation rule data structure, necessary to verify the correlation rule.

The query submodule 102c includes program code for receiving the coordinates for the databases 112 to be queried and generates a query to be transmitted to the databases 112 corresponding to the query.

The database interface submodule 102d may be part of the correlation module 102, or may be separate from the correlation module 102. There may be a database interface submodule 102d for each of the databases 112 that can be queried by the system 100. The database interface submodule 102d receives the query from the query submodule 102c and adapts the query to the format of the database 112 to be queried. This is because each database may have specific properties and configurations, and the query generated by the query module 102c may not be compatible with the external database 112. The database interface submodule 102d then transmits the adapted query to the database 112. As such, in some examples of the area monitoring logic 300, there may be a plurality of database interface submodules 102d corresponding respectively to each of a plurality of external databases 112, where each of the database interface submodule 102d has program code for adapting the query such that it may be received and processed to query the database 112.

The database interface submodule 102d also includes program code to receive a set of occurrence records from the database 112 corresponding to the query and transmitting the set of occurrence records such that the area monitoring logic 300 may process the set of occurrence records and verify the conditions of the correlation rule based on the set of occurrence records.

The report module 107 includes program code for processing a received set of occurrence records from the queried database(s) 112 as a function of the conditions of the correlation rule as defined in the correlation rule data structure. The report module 107 then verifies if the conditions of the correlation rule are met. If the conditions of the correlation rule are met, the report module 107 generates a correlated dataset from the set of occurrence records and the first occurrence record corresponding to the event.

The report module 107 may then transmit the correlated dataset to a graphic user interface displayed on, e.g., the computing device 200 of a user. The correlated dataset may be visualized as points displayed on a map. For instance, if the occurrence records of the correlated dataset include a geographical parameter, the geographical parameter may be utilized to position the occurrence record on the map such that the occurrence record appears as, e.g., a pin on the map. This is illustrated, for example, in the exemplary graphical user interface of FIG. 12, where, on the right-hand side, the pins are illustrated on the map.

The report module 107 may also transmit to the user photographs corresponding to information of the occurrence record (e.g. the photograph of a convict; the vehicle associated with a specific license plate, etc.).

The user may further request that additional information be provided after receipt of the correlated dataset, that can be associated with the correlated dataset (e.g. for additional photographs of a convict; the colour and license plate of a vehicle that was involved in an accident, etc.) For example, the request may be processed by the system 100 as an event, such that the event submodule 102a receives the request for additional information, the area monitoring logic 300 carrying out the request similarly to when an occurrence record that is, for example, pushed to the system 100.

Figure 4:
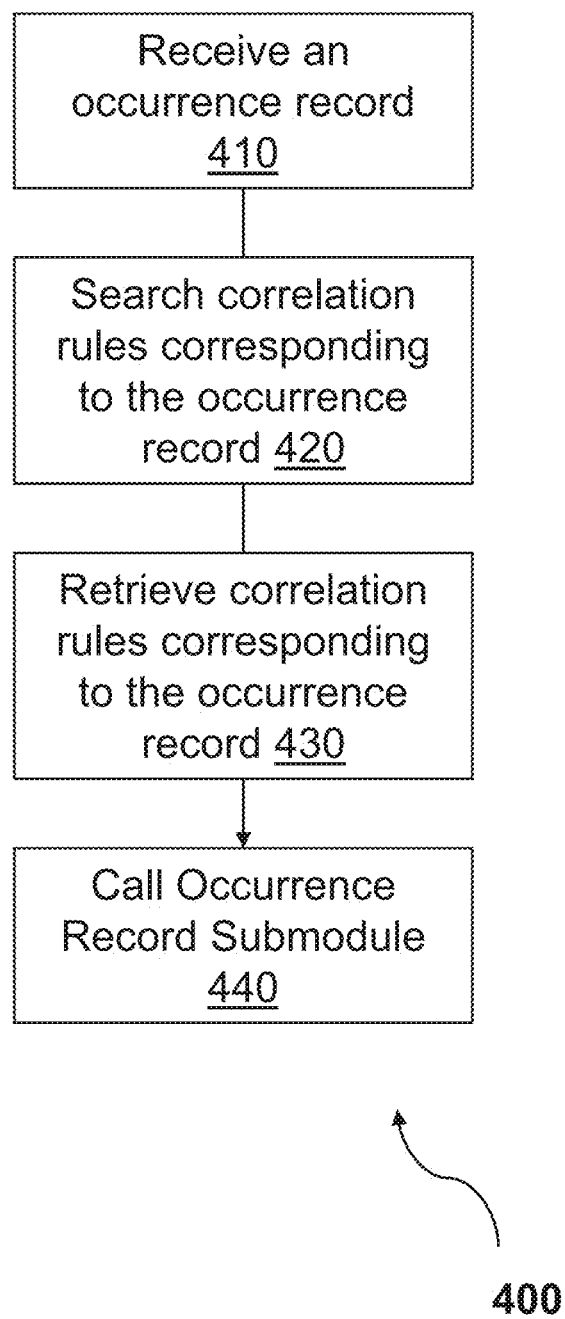
FIG. 4 is a flowchart diagram of an exemplary set of steps carried out by an exemplary event submodule of a correlation module stored in memory and executed by a processor of an exemplary area monitoring system.

The Event Submodule:

Reference is now made to FIG. 4, illustrating an exemplary set of steps 400 carried out by the program code of the event submodule 102a when executed by a processor.

In some examples, occurrence records may be pushed to the event submodule 102a from the databases 112 as occurrence records are added to the databases 112. In other examples, the event submodule 102a (or the database interface submodule 102d) may monitor the databases 112 for new occurrence records that correspond to an occurrence record type.

As such, the event submodule 102a receives an occurrence record at step 410, the occurrence record corresponding to an event. The occurrence record may include data on the type of the occurrence record, the time associated to the event of the occurrence record, and the location associated to the event of the occurrence record.

The event submodule 102a may then perform a search in the correlation rule database 110 for correlation rule data structures corresponding to the occurrence record. For instance, a correlation rule data structure may include data on the type of occurrence record that triggers verifying if the conditions of the correlation rule are met. In some examples, the correlation rule data structure may further include at least one initial trigger event condition. The event submodule 102a may verify that the occurrence record meets the initial trigger event condition. For example, the correlation rule may be triggered when an occurrence record corresponding to a 911 call (the occurrence record type) with the word "FIRE" mentioned during the call (the initial trigger event condition). In some examples, the event submodule 102a may receive as data corresponding to the first occurrence record a string of characters of the 911 call. The event submodule 102a may parse the string of characters for the word "FIRE" (or other keywords set by a user when defining, for instance, a correlation rule). Therefore, in some examples, the event submodule 102a may analyze the occurrence record to further define the type of the occurrence record. In this example, the occurrence record is a 911 call associated with FIRE.

In other examples, event submodule 102a may receive the category of 911 call, where the analysis of the call may be done, for instance, by the external engine or server associated with the external database 112.

The data structure of the correlation rule may be analyzed to identify the trigger occurrence record type of the correlation rule data structure. The event submodule 102a may then retrieve the correlation rule data structures of the correlation rules corresponding to the occurrence record type of the first occurrence record at step 430. In other examples, the search for the appropriate correlation rule data structures may be based on other search criteria, alternatively or in addition to the occurrence record type. For instance, the search may be based on a time parameter or on a geographical parameter.

Once the correlation rule data structures have been retrieved, the event submodule 102a calls the occurrence record submodule 102b at step 440.

In some examples, the event submodule 102a may include program code to retrieve a correlation rule data structure after being called by the query submodule 102c. The event submodules 102a may then transmit the retrieved correlation rule data structure to the query submodule 102c. The query submodule 102c may then generate the query as a function of the correlation rule data structure as explained herein.

Figure 5:
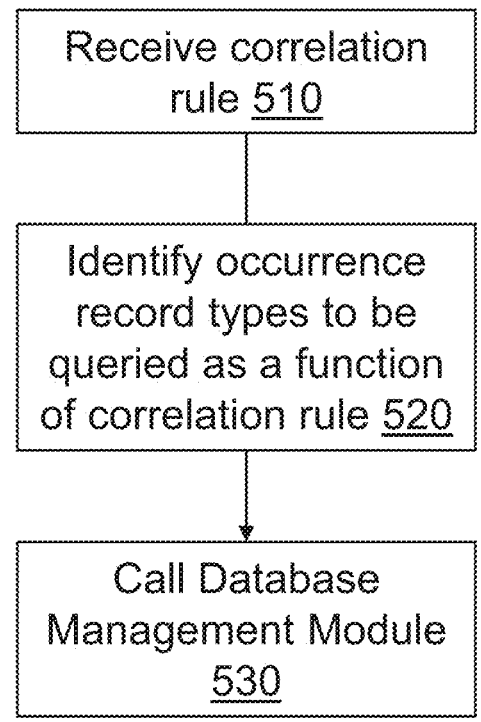
FIG. 5 is a flowchart diagram of an exemplary set of steps carried out by an exemplary occurrence type submodule of a correlation module stored in memory and executed by a processor of an exemplary area monitoring system.

The Occurrence Type Submodule:

Reference is now made to FIG. 5, illustrating an exemplary set of steps 500 carried out by the program code of the occurrence type submodule 102b when executed by a processor.

The occurrence type submodule 102b receives the one or more correlation rule data structures at step 510 corresponding to the initial occurrence record (e.g. tied to the event). The occurrence type submodule 102b then retrieves from the correlation rule data structure the one or more occurrence record types that are required to verify the conditions of the occurrence record, identifying the occurrence record types corresponding to the correlation rule at step 520.

The occurrence type submodule 102b then calls the database management module 103 at step 530.

In some examples, the correlation module 102 may not have an occurrence type submodule 102b. In these examples, the event submodule 102b, instead of retrieving the entire correlation rule data structure, may instead retrieve the information on the occurrence record types corresponding to the correlation rules that are associated to an occurrence record type that match the type of initial occurrence record (associated with the event).

In some examples, the occurrence type submodule 102b transmits the retrieved correlation rule data structures to the query submodule 102c such that the query submodule 102c may generate the query as explained herein.

Figure 6:
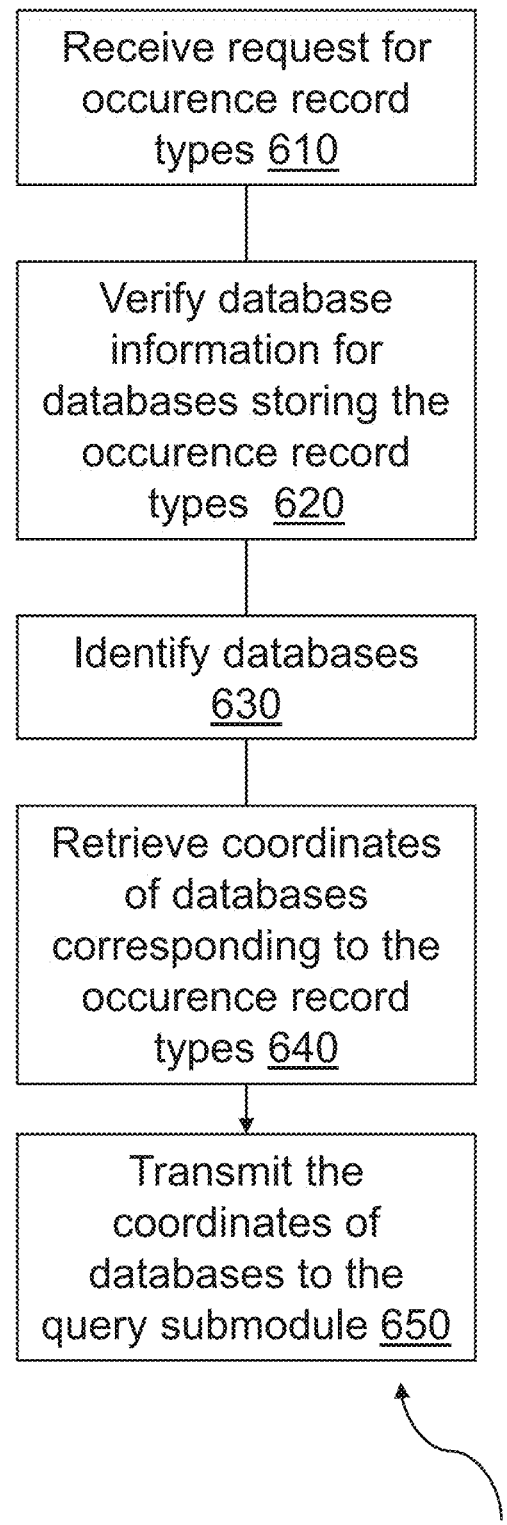
FIG. 6 is a flowchart diagram of an exemplary set of steps carried out by an exemplary database management module stored in memory and executed by a processor of an exemplary area monitoring system.

Database Management Submodule:

Reference is now made to FIG. 6, illustrating an exemplary set of steps 600 carried out by the program code of the database management submodule 103 when executed by a processor.

The database management module 103 receives a request by the correlation module 102 (e.g. the occurrence type submodule 102b or the event submodule 102a) to identify databases storing occurrence records corresponding to the occurrence record types identified by the correlation module 102 at step 610.

The database management module 103 then searches through the database attribute data structures for the databases 112 queryable by the system 100, stored in the database attribute database 118 at step 620.

The database management module 103 may search in each database attribute data structure the information on the occurrence record type or types for that database. For instance, the database management module 103 may search the database attribute data structure for the field of "occurrence record type", and compare the content of the field with the occurrence record type to be searched. If the comparison is positive, then the identification of the database 112 may be retrieved at step 630, and/or the coordinates of the database 112 as defined in the database attribute data structure at step 640. For instance, the database management module 103 may search for the field associated with the "coordinates of the database", and retrieve the value for the coordinates of the database stored in the field.

The coordinates of the database, as stored in and retrieved from the database attribute data structure may be a globally unique identifier (GUID) that identifies the role of the database 112 in the system 100. In some examples, the system 100 performs its own routing to the databases 112.

An exemplary globally unique identifier for a database may be, for instance, a unique string of characters for a given database such as 694A5F61-604B-4ED0-BDB2-E1DFCC184CDD.

A data structure of the coordinates of the different databases of interest may be generated by the database management module 103 (e.g. a link list or an array of the coordinates for the databases of interest).

The data structure corresponding to the coordinates of the databases of interest may then be transmitted to the query submodule 102c of the correlation module 102 at step 650.

Figure 7:
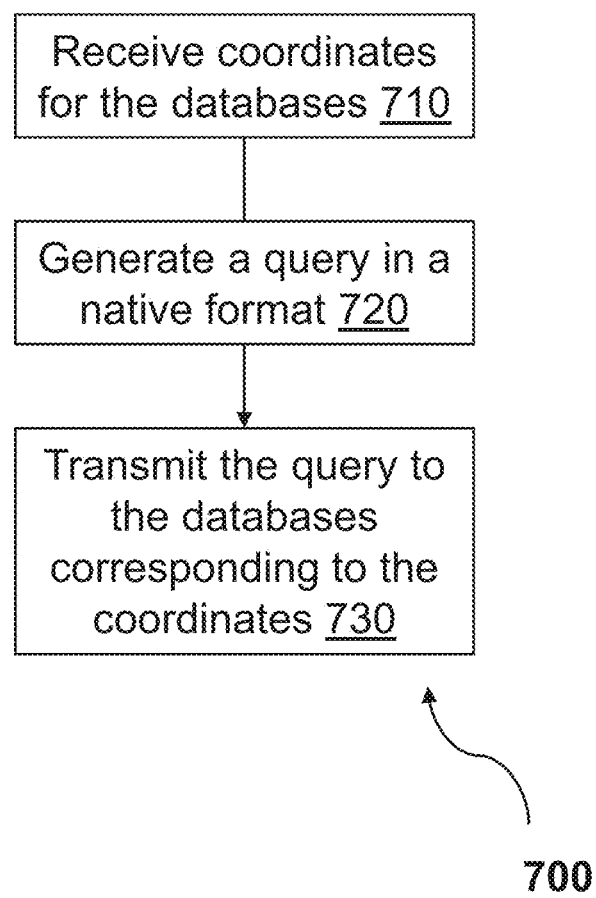
FIG. 7 is a flowchart diagram of an exemplary set of steps carried out by an exemplary query submodule of a correlation module stored in memory and executed by a processor of an exemplary area monitoring system.

Query Submodule:

Reference is now made to FIG. 7, illustrating an exemplary set of steps 700 carried out by the program code of the query submodule 102c when executed by a processor.

The query submodule 102c receives the data structure of the coordinates of the databases storing the occurrence records of the identified occurrence record types at step 710.

The query submodule 102c may then receive a correlation rule data structure (or as a function of a correlation rule data structure that the query module 102c has received) by calling, for instance, the event submodule 102a or the occurrence type submodule 102b, the event submodule 102a or the occurrence type submodule transmitting the correlation rule data structure to the query submodule 102c.

Retrieving the values and parameters of the conditions of the correlation rule as defined in the correlation rule data structure, the query submodule 102c generates a query for retrieving occurrence records corresponding to the occurrence record types associated with the values and parameters of the conditions of the correlation rule as defined in the correlation rule data structure at step 720. The query may be generated in the native format of the system 100. In some examples, a query may be specifically generated by the query submodule 102c in the format of the database 112 to be queried. The query is generated according to a respective protocol. In some examples, the query is generated according to a remote protocol.

The query generated by query submodule 102c may include the occurrence record type to be queried, a time parameter to further limit the occurrence records retrieved by processing the query to those that correspond to the time parameters (e.g. that have been recorded on or within the time parameter) e.g. a point in time; a range of time, etc. The query may also include a geographical parameter to further limit the occurrence records retrieved by processing the query to those that correspond to the geographical parameter, where the geographical parameter may be, e.g. a specific set of coordinates defining a precise location, an area defined by a set of sets of coordinates, etc. It will be understood that the query may include other parameters to further identify the occurrence records to be retrieved by processing the query without departing from the present teachings.

An exemplary query in the format of the system 100 is:

```
// Query correlated events
var queryEvents = Sdk.ReportManager.CreateReportQuery(ReportType.Custom)
as CustomQuery;
if (queryEvents != null)
{
    queryEvents.CustomReportId =
Plugins.Correlation.Models.Constants.QueryIds.GetAllDefaultCorrelatedDataQue
ryGuid;
    var customFilter = new GetAllDefaultCorrelatedDataReportFilter( )
    {
        AdditionalQueryParameters = ProcessTokens(tokens),
        GlobalMaximumNumberOfResults =
GlobalMaximumNumberOfResults+1,
        ReferencePointInTimeAndSpace = new
PointInTimeAndSpace(DateTime.UtcNow, location.ToPclVersion( ))
    };
    var queryAsyncState = new QueryAsyncState(queryEvents, location,
alertItem);
    var json = JsonConvert.SerializeObject(customFilter);
    queryEvents.FilterData = json;
    queryEvents.BeginQuery(OnQueryCorrelatedEventsCompleted,
queryAsyncState);
}
```

The query may then be transmitted to the server managing the database 112, or, in some examples, the database interface submodule 102d associated with the given database 112.

Figure 8:
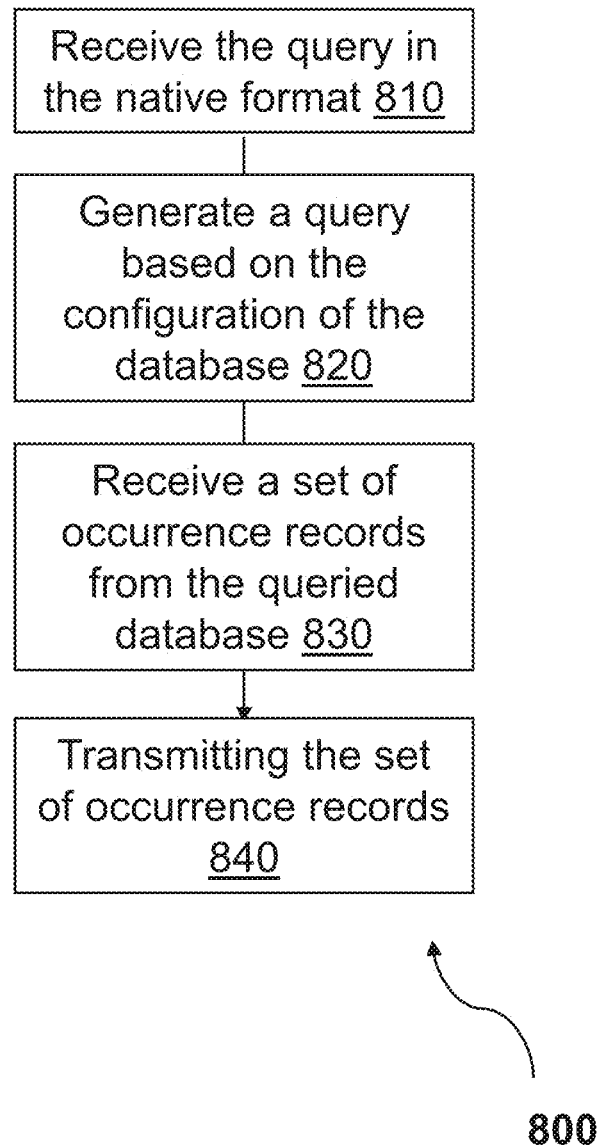
FIG. 8 is a flowchart diagram of an exemplary set of steps carried out by an exemplary database interface submodule of a correlation module stored in memory and executed by a processor of an exemplary area monitoring system.

Database Interface Submodule:

Reference is now made to FIG. 8, illustrating an exemplary set of steps 800 carried out by the program code of the database interface submodule 102d when executed by a processor.

In some examples, the area monitoring logic 300 has a database interface submodule 102d for interfacing with an external database 102d.

In other embodiments, the database interface submodule 102d corresponds to a data source interface 111.

When the query submodule 102c generates the query in the native format of the system 100, the database interface submodule 102d receives the query in the native format from the query submodule 102c at step 810.

The query submodule 102c then generates a query specific to the configurations of the external database 112 as a function of the query received from the query submodule 102c at step 820. In some examples, the program code of the database interface submodule 102d includes the configuration of a specific database 112, including a value corresponding to the occurrence record type. The adapting of the query may also limit the query to the occurrence record types stored in the specific database 112, as a function of the configuration of the database interface submodule 102d.

An exemplary query in the format of a database, corresponding to the query detailed above in the format of the system 100, is:

```
public async Task<List<bool>>
QueryAllDatumsAsync(GeospatialAndTemporalQueryParameters parameters,
IList<ExtendedAttributeSearchTerm> additionalParameters,
        Action<List<CorrelatedDatum>> partitionAction, int? globalMax,
IDictionary<Guid, int> guidMaximums, CancellationToken cancellation)
{
    var state = State;
    if (state != BackendEngineState.Up)
    {
        throw new Exception("Backend not ready");
    }
    var registrations = _registrations.Select(r => r.Value);
    List<Task<bool>> tasks = new List<Task<bool>>( );
    foreach (var reg in registrations)
    {
            var max = guidMaximums.TryGetMaximum(globalMax,
reg.DatasourceTypeGuid);
                    tasks.Add(reg.QueryDatumsAsync(parameters,
additionalParameters, max, cancellation).ContinueWith(tsk =>
            {
                    if (tsk.IsCompleted &&
!cancellation.IsCancellationRequested)
                    {
                        partitionAction(tsk.Result);
                        return true;
                    }
                    return false;
            }, cancellation));
    }
    await Task.WhenAll(tasks.Select(t => (Task)t).ToArray( ));
    return tasks.Select(t => t.Result).ToList( );
}
```

The adapted query is sent to, e.g., to the database server that houses database 112.

The database interface submodule 102*d* may then receive the set of occurrence records stored in the database 112, transmitted by the database server, resulting from the adapted query at step 830. For instance, if the query was for gunshots events in a timespan of two hours before a 911 call, and in a region of 250 meters around the location of the 911 call, the set of occurrence records may be the data structures corresponding to the gunshot events meeting the conditions of the query. In some examples, the set of occurrence records may simply be a value. For instance, if only two gunshot events match the criteria of the query, then the response to the query may be the value of "2".

In some examples, the database interface submodule 102*d* may convert the set of occurrence records received from the database server to a format that can be processed by the system 100. In other examples, the set of occurrence records are already generated by the database server in a format that can be processed by the occurrence record. In some examples, the database interface submodule 102*d* may process the data received from the database server. For instance, the data structure corresponding to the set of occurrence records may be tagged by the database interface submodule 102*d* to identify the correlation rule or the query which generated the set of occurrence records. This may be provided to facilitate the report module 107 to associate the set of occurrence records it receives with the originating correlation rule (e.g. when multiple queries are being generated by the correlation module 102 to multiple databases).

In some examples, the database interface submodule 102*d* may call the report module 107. The database interface submodule 102*d* then transmits the set of occurrence records to the record module 107 at step 840.

Figure 9:
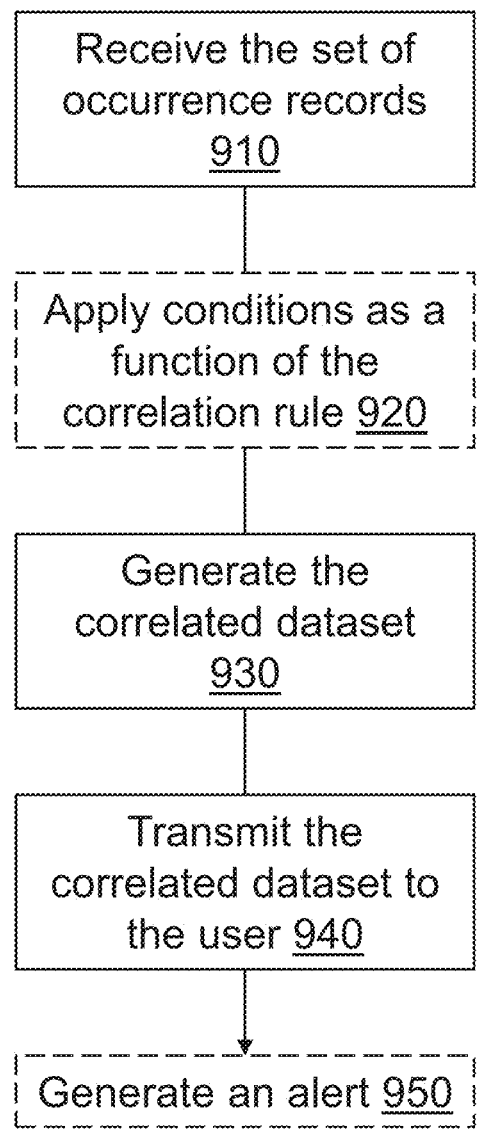
FIG. 9 is a flowchart diagram of an exemplary set of steps carried out by an exemplary report module stored in memory and executed by a processor of an exemplary area monitoring system.

The Report Module:

Reference is now made to FIG. 9, illustrating an exemplary set of steps 900 carried out by the program code of the report module 107 when executed by a processor.

The report module 107 receives the set of occurrence records from the database interface submodule 102*d* in step 910.

In other examples, the area monitoring logic 300 may instead include program code to process each request for a correlated dataset sequentially. When, upon the happening of an event, a query for a given correlation rule is generated. Upon receipt of the set of occurrence records, the report module 107 produces the correlated dataset, transmitting it to the client, then beginning processing the next request for a correlated dataset.

In other examples, multiples requests for correlated dataset may be processed at once. For instance, the report module 107 may initially analyze the set of occurrence records to associate the set of occurrence records with a given correlation rule. For instance, when the database interface submodule 102*d* adds an identifier to the set of occurrence records to associate the set of occurrence records with a query or correlation rule, the report module 107 may retrieve the value of the identifier, and associate the set of occurrence records with a given correlation rule.

The report module 107 may further analyze the set of occurrence records received at step 920. This analysis may be to verify if the conditions of the correlation rule defined in the correlation rule data structure are met.

For example, the set of occurrence records may be two sets of gunshot event details that were recorded, corresponding to the parameters of the query. The report module 107 may then analyze the set of occurrence records to output the value of "2", corresponding to the number of gunshot events in the set of occurrence records.

The report module 107 then verifies, as a function of the set of occurrence records, if the conditions of the correlation rule are met. For instance, in the case of the gunshot events, if the correlation rule sets the number of gunshots to greater than one, then the report module 107 establishes the number of gunshot events retrieved from the set of occurrence records (i.e. "2"), compares it to the condition of the correlation rule, and sets the condition of the correlation rule to true (the condition being met as a function of the set of occurrence records).

The report module 107 may then generate a correlated dataset of occurrence records corresponding to the set of occurrence records retrieved and the initial occurrence record that triggered the query (e.g. the initial event).

The correlated dataset is a data structure including data that matches and/or that is relevant to the verified correlation rule. The dataset to be transmitted to the user upon a positive correlation may be set by the user when generating the correlation rule. In other examples, the user may make further requests for data as a function of the correlated dataset received.

An exemplary datum of a correlated dataset may have one or more of the following exemplary properties (but not limited thereto):

{
   "RoleId": Unique identifier of source role who is responsible for this datum,
   "SourceId": The id of the datum in the source system,
   "Latitude": floating point number,
   "Longitude": floating point number,
   "Time": UTC Timestamp,
   "DataType": Unique identifier of the data type,
   "AdditionalProperties": <string,string> map
}

The RoleId may be the id of the database 112 which returned this datum.

The SourceId may be the id of the datum in the system 100 (is unique within that source system)

The DataType may be the unique identifier of this data type.

AdditionalProperties may be any additional properties which are stored in a map of string to string. This may allow for generic data appending since any serializable .NET object that can be converted to a JSON (Java Script Object Notation) string.

The correlated dataset is then transmitted to the user by the report module 107 at step 940.

The correlated dataset may be visualized on the user interface 109, the display 217, etc.

In some examples, an interrelationship of the correlated dataset may be further determined by the report module 107, where the interrelationship may be displayed to the user. For instance, the interrelationship may be displayed on a map, where each datum of the correlated dataset may appear as a pin on a map, the map delineating an area of interest such as the one defined by the correlation rule (as shown, e.g., on the example of a graphical user interface of FIG. 12).

In some examples, the report module 107 may trigger the computing device 200 of the user to issue an alert signaling the determination of a correlated dataset. In some examples, the alert may be an audio alert generated by the speaker 202. In other examples, the alert may be a vibration generated by the vibration motor, a message appearing on the display 217 of the computing device 200, etc.

Figure 10:
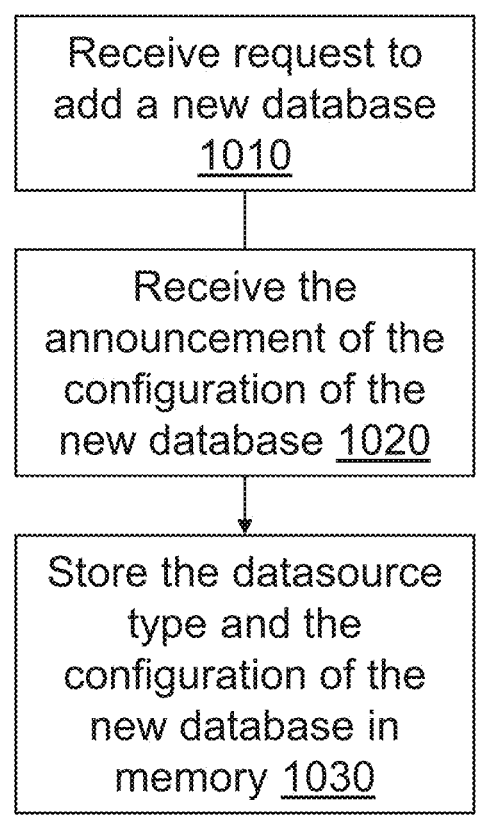
FIG. 10 is a flowchart diagram of an exemplary set of steps carried out by an exemplary database management module stored in memory and executed by a processor of an exemplary area monitoring system for adding a new database to the area monitoring system.

Registering a New Database with the Area Monitoring System:

Reference is now made to FIG. 10, illustrating an exemplary set of steps 1000 carried out by program code of the database management module 107 when executed by a processor to add a new database to the system 100.

The database management module 107 may receive a request to add a new database 112 to the system 100 at step 1010. In some examples, the database 112 may announce itself to the database management module 107. When the database 112 announces itself to the system 100, it may announce its configuration to database management module 107 at step 1020. By announcing its configuration, the database 112 may announce, for instance, the occurrence record type that it stores, the fields it supports (e.g. for an impounded vehicle database: the fields of the license plate number; the colour of the vehicle; the make, etc.), its coordinates, the data server that manages the database 112, etc.

From the announcement, the database management module 107 may create a database attribute data source that is stored in the database attribute database 118. The database attribute data source may include the information of the database 112 corresponding to its announced configuration.

The database management module 107 may maintain and update a mapping of the different queryable external databases 112 of the system 100 (and, in some examples, internal databases), stored in the database attribute database 118. The database management module 107 may map the different databases 112 by occurrence record types. As such, the database management module 107 may retrieve the identity and/or coordinates of the database(s) 112 corresponding to a given occurrence record type when receiving such a request from the correlation module 102.

Figure 12:
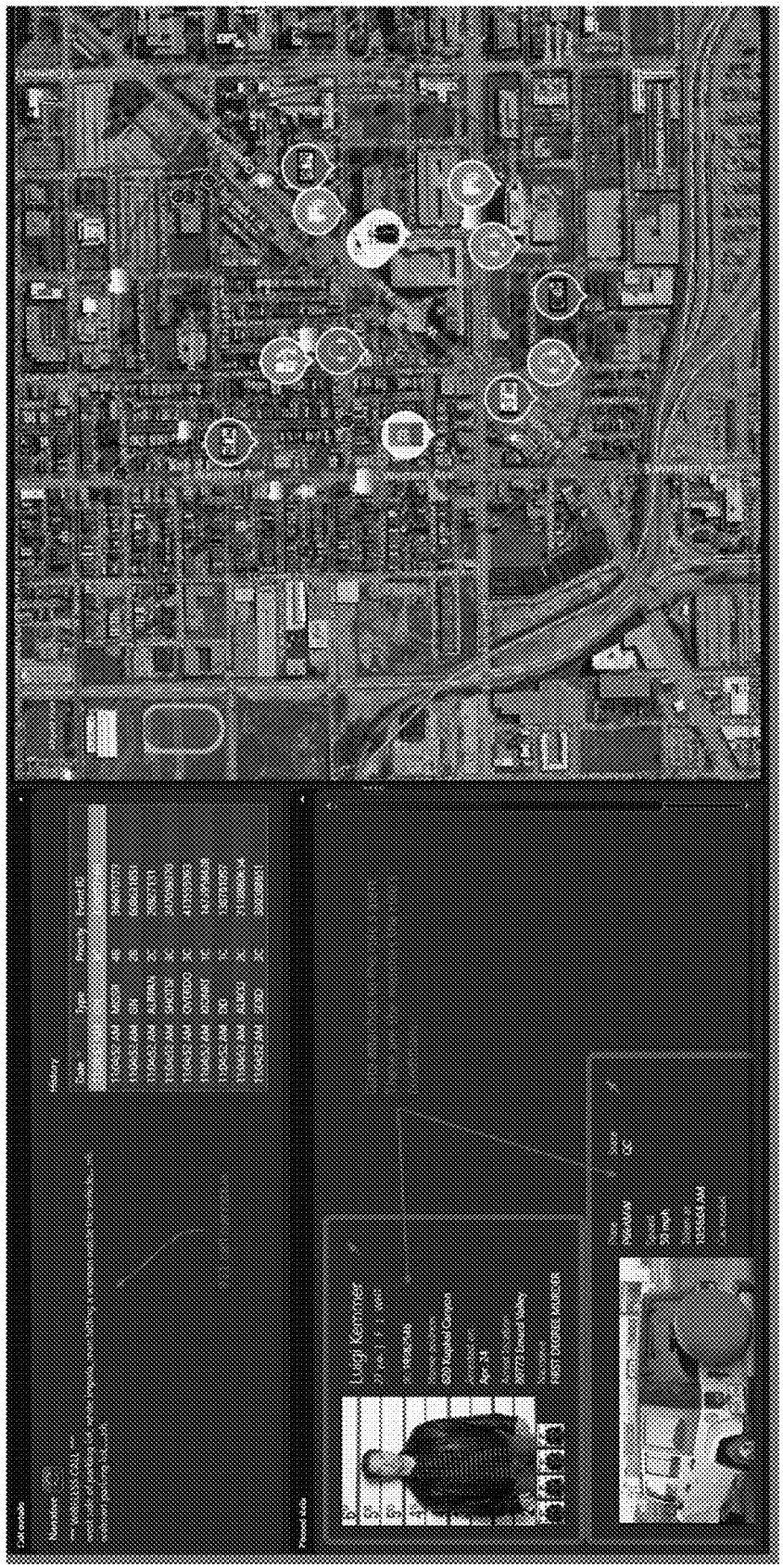
FIG. 12 is a depiction of a window for displaying the interrelationship of a correlated dataset in an exemplary graphical user interface for an area monitoring system.

Graphical User Interface:

Reference is now made to FIGS. 11 and 12, illustrating exemplary windows of a graphical user interface of a system 100 that may be accessed by a user of the system 100.

In some examples, the graphical user interface may be accessible through a website on the computing device 200 of the user. In other examples, the graphical user interface may be accessed via an application program running on the computing device 200 of the user that can establish a connection (e.g. a wireless connection) with the system 100.

The correlated dataset and the interrelationship between the occurrence records of the correlated dataset may be displayed on the graphical user interface as shown in FIG. 12.

The exemplary window of the graphical user interface of FIG. 12 is broken down into three components. The upper left-hand window provides a description of the initial occurrence record (the event) that initiated the sequence resulting the query and the generating of the correlated dataset. In the example of FIG. 12, the initial occurrence record is a 911 call describing battery and assault inside a vehicle at the location of a Walmart.

The lower portion of the left-hand side of the window of FIG. 12 displays the correlated dataset of the occurrence records retrieved following the query. The correlated dataset includes a first occurrence record of the identity and picture of a criminal who was arrested for first degree murder, and a second occurrence record corresponding to vehicle details provided from a license plate read event, corresponding to the description of the vehicle from the 911 call (e.g. the picture of the vehicle; the license plate; the time the license plate reading was taken).

The right portion of the graphical user interface corresponds to a map of an area to be monitored, showing an interrelationship of the different occurrence records that correspond to the correlated dataset as a function of the geographical parameter of the occurrence records. A different symbol may be used to identify a different occurrence record type. For instance, a gun may be used to identify a gunshot event, a license plate to identify a license plate read event. The occurrence records appear as pins populating the map.

It will be understood that other mechanisms of visualizing the interrelationship of the occurrence records of the correlated dataset may be provided without departing from the present teachings.

FIG. 11 shows an exemplary embodiment of a window of a graphical user interface appearing on a computing device 200 allowing a user to interact with the system 100 and create a correlation rule.

The user may define a name for the correlation rule, and provide an expiry date and time, at which time the correlation rule data structure corresponding to the correlation rule will be deleted. The expiry time may be stored as a value in one of the fields of the correlation rule data structure.

The right-hand top portion demonstrates an exemplary initial occurrence record (e.g. event), that when received, results in the generating of a query corresponding to the correlation rule appearing in the window. For instance, the occurrence record type is that of a computer-aided dispatch related to carjacking.

The bottom right-hand portion presents the conditions of the correlation rule that, once met, result in the reporting of a correlated dataset.

In the example of FIG. 11, these conditions are:
look for police units within 1000 feet;
look for parolees within 250 feet when seen more than 1 time, with an age over 16;
there is at least one gang registered in a designated sector.

Other conditions may be added to the correlation rule. Conditions may also be removed or adapted from a given correlation rule by user the graphical user interface.

Example of a Correlation Rule:

An exemplary correlation rule is as follows:

Upon receiving a 911 call for service
1. Check the call has type='CARJK' (carjacking)
2. Check the call priority <=2
3. If
   a. Police Officer Locations
      i. Where the officer is within 1000 ft of the 911 call location (latitude/longitude)
      ii. There are >=1 officers
   b. AND Parolees
      i. Live within 250 ft of the call location
      ii. There are >=1 parolees
      iii. Is on parole for car-theft
   c. AND any Posts on Social Media (TWITTER™/FACEBOOK™/etc)
      i. Are geo-tagged within 100 ft
      ii. Contain a picture
      iii. Are timestamped within 20 minutes
   d. AND 911 call occurred within a gang territory In this example, the occurrence record type that triggers the correlation rule is a 911 call. In addition, the correlation rule data structure has a set of initial trigger event conditions associated with the occurrence record type to be met by the occurrence record in order to trigger the verification of the correlation rule: it is a 911 call related to carjacking, and with a call priority of less than or equal to 2. Upon receiving an occurrence record corresponding to a 911 call, the 911 call may be processed to generate a string of characters corresponding to the words spoken during the call. The string of characters may then be parsed to identify the term "CARJACK*" "THEFT" and "CAR", etc. In some examples, when the event submodule 102a receives the occurrence record, the data server of the database 112 managed, e.g., by a computer-aid dispatch system, may have already categorized the call. The occurrence record may also include data regarding the call priority.

Upon an occurrence record matching the conditions of the trigger occurrence record type of the correlation rule, the correlation rule data structure may be retrieved. A query may be generated to obtain from external databases occurrence records for verifying if the conditions of the correlation rule are met. The query corresponds to the occurrence record types defined in the correlation rule. The query is sent to the databases that store occurrence records corresponding to the occurrence record types.

With respect to the above example, the databases 112 to query are:
- the database(s) storing 911 call occurrence records;
- the database(s) storing police officer location occurrence records;
- the database(s) storing posts on social media (e.g. FACEBOOK™; TWITTER™; LINKEDIN™; SNAPCHAT™; INSTAGRAM™, etc.); and
- the database(s) storing information relating to occurrence records on gang territory (or information on gang territory).

Therefore, the query that is generated is based on the correlation rule, in order to retrieve data necessary to verify that the conditions of the correlation rule are met. As such, the query generated by the query submodule 102c, in the present example, is sent separately to databases storing 911 calls; databases storing police officer locations; database storing social media posts; and databases storing information on gang territory.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of merging occurrence records in an area monitoring system whereby events are monitored or recorded in external databases, the method comprising:
   receiving a first occurrence record, indicative of an event, including a geographical parameter, a chronological parameter and an occurrence record type, and identifying an applicable correlation rule in a correlation rule database based at least on the occurrence record type, wherein the geographical parameter, the chronological parameter and the occurrence record type are stored in the first occurrence record;
   on the basis of the applicable correlation rule, identifying a set of databases to be queried from a plurality of databases, each database of the plurality of databases comprising a plurality of occurrence records, each occurrence record of the set of databases being associated with a respective occurrence record type;
   for each database in the set of databases, generating a query for data according to a respective protocol, the query comprising at least a geographic constraint or a chronological constraint based on, respectively, the geographical parameter or the chronological parameter of the first occurrence record;
   receiving in response to the query a set of occurrence records, each occurrence record of the set of occurrence records originating from one of the databases in the set of databases, and having at least one geographical parameter or chronological parameter respecting the geographic constraint or chronological constraint, respectively, set forth in the query to its originating database;
   generating a correlated dataset of occurrence records from at least a subset of the set of occurrence records and the first occurrence record; and
   displaying to a user a visual representation of said correlated dataset of occurrence records.

2. The method as defined in claim 1, further comprising:
   defining and storing an interrelationship between the occurrence records of the subset of occurrence records and the first occurrence record, the interrelationship comprising a common event to which each of the interrelated occurrence records are related; and
   displaying to a user a visual representation of the interrelationship between the occurrence records of the correlated dataset.

3. The method as defined in claim 2, wherein the visual representation of the interrelationship between the occurrence records of the correlated dataset is displayed on a map on a display, and at least a portion of the occurrence records of the correlated dataset appearing as pins on the map.

4. The method as defined in claim 1, wherein the first occurrence record corresponds to one of a received 911 call, a license plate read event, a license plate hit event, camera bookmark event and an access control event.

5. The method as defined in claim 1, wherein the correlation rule comprises a set of conditions, and the method further comprising, prior to the generating a correlated dataset of occurrence records, verifying that the conditions of the correlation rule are met.

6. The method as defined in claim 1, wherein the correlation rule is associated with at least one occurrence record type, and wherein each identified database to be queried stores occurrence records corresponding to at least one of the at least one occurrence record type.

7. The method as defined in claim 1, wherein the identifying the databases to be queried comprises retrieving the coordinates of the databases to be queried from a database attribute database.

8. The method as defined in claim 1, wherein the identifying an applicable correlation rule in a correlation rule database is further based on at least one initial trigger event condition of a correlation rule.

9. The method as defined in claim 1, further comprising generating an alert when a correlated dataset has been generated.

10. The method as defined in claim 1, wherein the respective protocol of the query is a remote protocol.

11. An area monitoring system comprising a correlation engine for communicating with a set of databases and a store of correlation rules to provide a report output when occurrence records of said set of databases satisfy at least one of said correlation rules, the correlation engine comprising a processor and a processor-readable memory storing instructions to cause said processor to perform:

receiving a first occurrence record, indicative of an event, including a geographical parameter, a chronological parameter and an occurrence record type, and identifying an applicable correlation rule in a correlation rule database based at least in part on the occurrence record type, wherein the geographical parameter, the chronological parameter and the occurrence record type are stored in the first occurrence record;

on the basis of the applicable correlation rule, identifying a set of databases to be queried from a plurality of databases, each database of the plurality of databases comprising a plurality of occurrence records, each occurrence record of the set of databases being associated with a respective occurrence record type;

for each database in the set of databases, generating a query for data according to a respective protocol, the query comprising at least a geographic constraint or chronological constraint based on, respectively, the geographical parameter or the chronological parameter of the first occurrence record;

receiving in response to the query a set of occurrence records, each occurrence record of the set of occurrence records originating from one of the databases in the set of databases, and having at least a geographical parameter or chronological parameter respecting the geographic constraint or chronological constraint, respectively, set forth in the query to its originating database; and providing a report output comprising a correlated dataset of occurrence records from at least a subset of the set of occurrence records and the first occurrence record.

12. The system as defined in claim 11, wherein the instructions further cause the processor to perform:

defining and storing an interrelationship between the occurrence records of the subset of occurrence records and the first occurrence record, the interrelationship comprising a common event to which each of the interrelated occurrence records are related; and displaying to a user a visual representation of the interrelationship between the occurrence records of the correlated dataset.

13. The system as defined in claim 12, wherein the instructions further cause the processor to perform:

generating the visual representation of the interrelationship between the occurrence records of the correlated dataset on a map appearing on a display, and at least a portion of the occurrence records of the correlated dataset appearing as pins on the map.

14. The system as defined in claim 11, wherein the instructions further cause the processor to perform:

generating an alert when a correlated dataset has been generated.

15. The system as defined in claim 11, wherein the first occurrence record corresponds to one of a received 911 call, a license plate read event, a license plate hit event, camera bookmark event and an access control event.

16. The system as defined in claim 11, wherein the correlation rule comprises a set of conditions, and the instructions further cause the processor to perform:

prior to the generating a correlated dataset of occurrence records, verifying that the conditions of the correlation rule are met.

17. The system as defined in claim 11, wherein the correlation rule is associated with at least one occurrence record type, and wherein each database of the identified databases to be queried stores occurrence records corresponding to at least one of the at least one occurrence record type.

18. The system as defined in claim 11, wherein the identifying an applicable correlation rule in a correlation rule database is further based on at least one initial trigger event condition of a correlation rule.

19. The system as defined in claim 11, wherein an at least one additional parameter of the first occurrence record comprises the occurrence record type.

20. The system as defined in claim 11, wherein the respective protocol of the query is a remote protocol.

* * * * *